US008344335B2

(12) United States Patent
Fleming et al.

(10) Patent No.: US 8,344,335 B2
(45) Date of Patent: *Jan. 1, 2013

(54) FIBRE OPTIC DOSIMETER

(75) Inventors: Simon Fleming, Lane Cove (AU); Justin Elsey, Drummoyne (AU); Susan Law, Concord West (AU); Natalka Suchowerska, Beecroft (AU); Jamil Lambert, Camperdown (AU); David Robert McKenzie, Artarmon (AU)

(73) Assignee: The University of Sydney, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,279

(22) Filed: Oct. 18, 2011

(65) Prior Publication Data

US 2012/0037808 A1    Feb. 16, 2012

Related U.S. Application Data

(60) Division of application No. 12/648,229, filed on Dec. 28, 2009, which is a continuation of application No. 12/162,591, filed as application No. PCT/AU2007/000081 on Jan. 30, 2007, now Pat. No. 7,663,123.

(30) Foreign Application Priority Data

Jan. 30, 2006  (AU) ............................... 2006900427

(51) Int. Cl.
*H05B 33/00* (2006.01)
*G01T 1/10* (2006.01)
(52) U.S. Cl. ..................................... 250/484.5; 250/368
(58) Field of Classification Search ................. 250/484.5
See application file for complete search history.

(56) References Cited

U.S. PATENT DOCUMENTS

| 4,047,034 A | 9/1977 | Auphan |
| 4,788,436 A | 11/1988 | Koechner |
| 5,006,714 A | 4/1991 | Attix |
| 5,237,173 A | 8/1993 | Stark et al. |
| 5,260,566 A | 11/1993 | Reed |
| 5,313,065 A | 5/1994 | Reed |
| 5,434,415 A | 7/1995 | Terada et al. |
| 5,491,548 A | 2/1996 | Bell et al. |
| 5,561,286 A | 10/1996 | Ruch et al. |
| 5,640,017 A | 6/1997 | Thevenin |

(Continued)

FOREIGN PATENT DOCUMENTS

FR         2822239 A1    9/2002

(Continued)

OTHER PUBLICATIONS

Law et al., "Signal versus noise in fiber coupled radiation dosimeters for medical applications," Jun. 2004, SPIE, 5317:105-115.

(Continued)

*Primary Examiner* — Marcus Taningco
(74) *Attorney, Agent, or Firm* — Morgan, Lewis & Bockius LLP

(57) ABSTRACT

A dosimeter for radiation fields is described. The dosimeter includes a scintillator a light pipe having a first end in optical communication with the scintillator and a light detector. The light pipe may have a hollow core with a light reflective material about the periphery of the hollow core. The dosimeter may further include a light source that generates light for use as a calibrating signal for a measurement signal and/or for use to check the light pipe.

9 Claims, 6 Drawing Sheets

FIGURE 1

U.S. PATENT DOCUMENTS

| | | |
|---|---|---|
| 5,905,262 A | 5/1999 | Spanswick |
| 6,087,666 A | 7/2000 | Huston et al. |
| 6,333,502 B1 | 12/2001 | Sumita et al. |
| 6,551,231 B1 | 4/2003 | Bliss et al. |
| 6,563,120 B1 | 5/2003 | Baldwin et al. |
| 6,920,202 B1 | 7/2005 | Dinsmore |
| 2001/0047136 A1 | 11/2001 | Domanik et al. |
| 2002/0168317 A1 | 11/2002 | Daighighian et al. |
| 2003/0163016 A1 | 8/2003 | Testardi |
| 2004/0238749 A1 | 12/2004 | Fontbonne et al. |
| 2005/0248393 A1 | 11/2005 | North |

FOREIGN PATENT DOCUMENTS

| | | |
|---|---|---|
| GB | 1 436 564 | 5/1976 |
| GB | 2375170 A | 11/2002 |
| JP | 55-116287 | 9/1980 |
| JP | 05-273354 A | 10/1993 |
| JP | 10-153663 | 6/1998 |
| JP | 2001-083254 | 9/1999 |
| JP | 2001-056381 | 2/2001 |
| WO | WO 01/14909 A1 | 3/2001 |
| WO | WO 01/64286 A1 | 9/2001 |

OTHER PUBLICATIONS

BLO Ref: 8406; "Fibre optic dosimeter for teletherapy using a scintillator couple with an air-cored optical fibre," Prior Art Searches 5.1 through 5.44.

Williamson et al, "Plastic scintillator response to low-energy photons," Phys. Med. Biol., 1999, (44)857-871.

Kirov et al, "Towards two-dimensional brachytherapy dosimetry using plastic scintillator: New highly efficient water equivalent plastic scintillator materials," Medical Physics, 1999, (26)8:1515-1523.

Archambault et al, "Plastic scintillation dosimetry: Optimal selection of scintillating fibers and scintillators," Medical Physics, 2005, (32)7:2271-2278.

International Search Report, PCT/AU2007/000081, Apr. 19, 2007, 5 pages.

Examiner's First Report on Patent Application No. 2009245866, 2 pgs, Mar. 5, 2010.

Office Action dated May 22, 2012 received in Japanese Patent Application No. 2008-552641 which corresponds to U.S. Appl. No. 13/276,279, pp. 9.

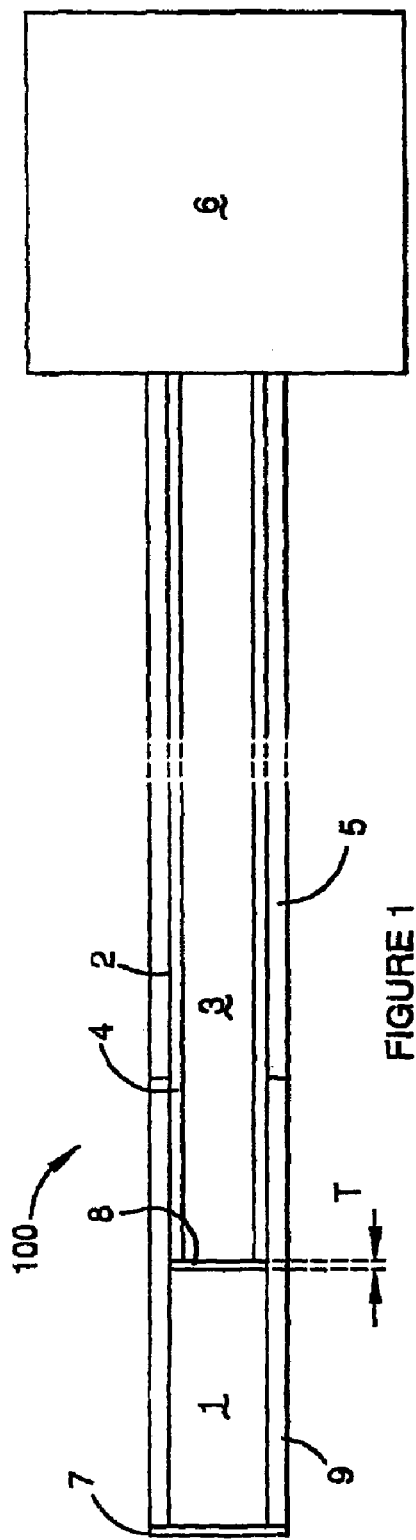
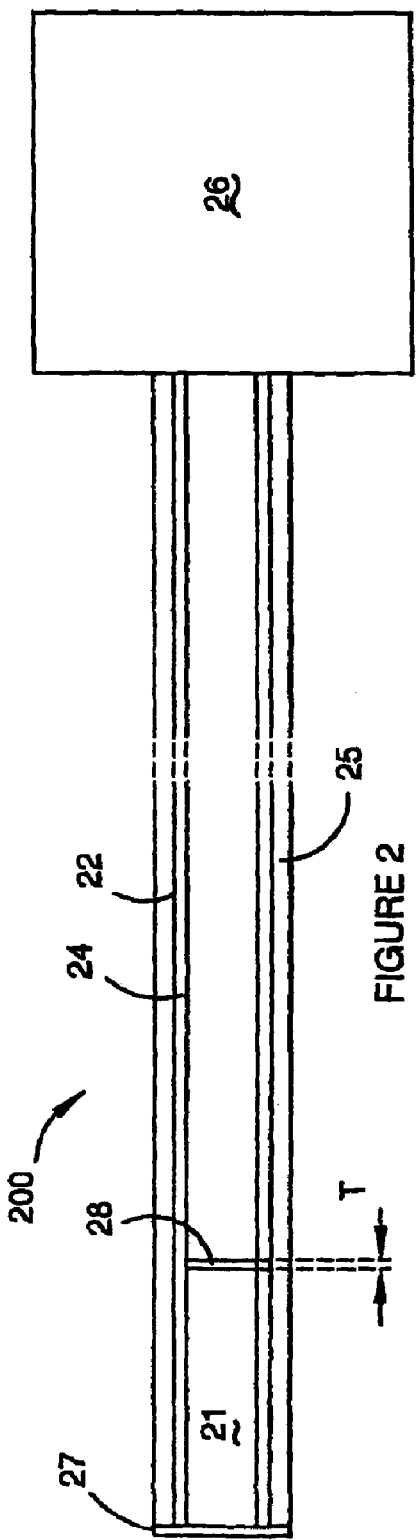

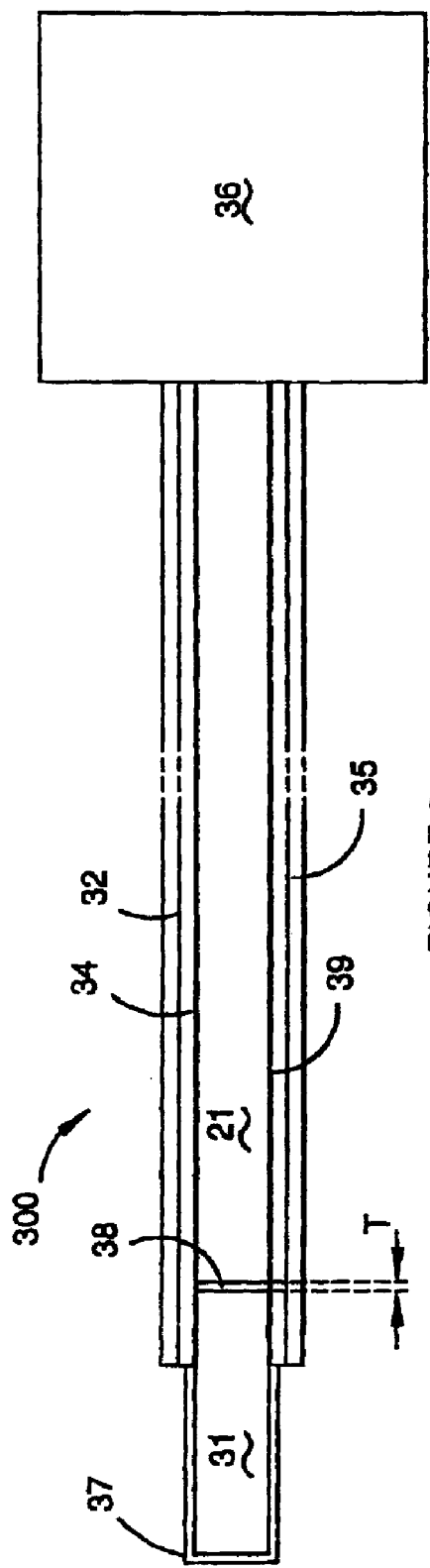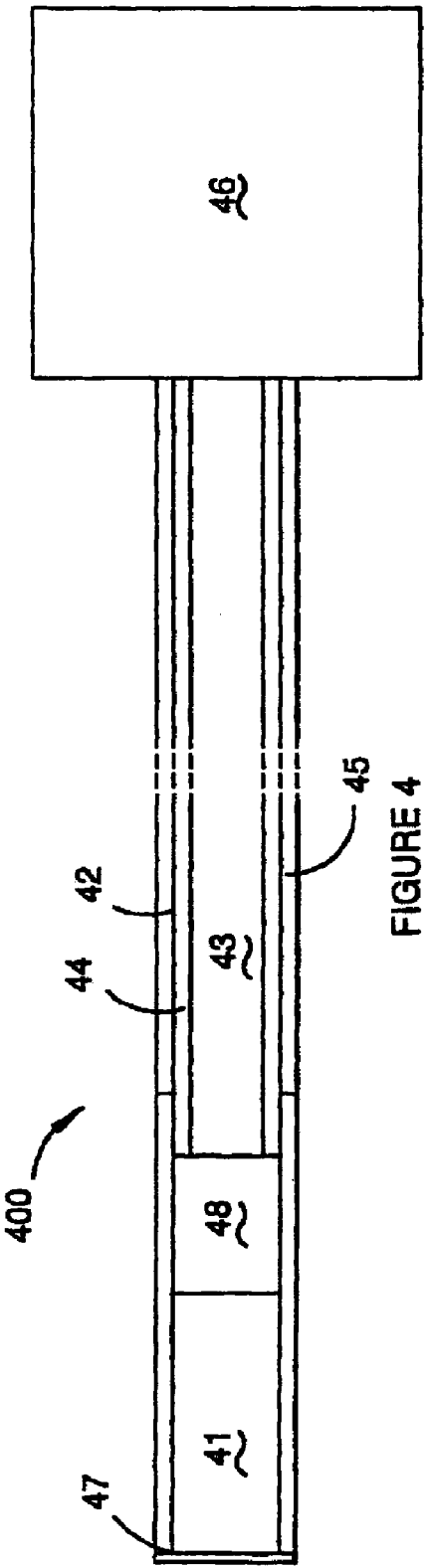

FIBRE OPTIC DOSIMETER

RELATED APPLICATIONS

This application is a divisional application of U.S. patent application Ser. No. 12/648,229, entitled "Fibre Optic Dosimeter," filed Dec. 28, 2009, which is a continuation application of U.S. patent application Ser. No. 12/162,591, entitled "Fibre Optic Dosimeter," filed Jul. 29, 2008 now U.S. Pat. No. 7,663,123, which claims priority to United States National Stage Application filed under 35 U.S.C. §371 of PCT Patent Application No. PCT/AU2007/000081, filed Jan. 30, 2007, which claims priority to Australian Application No. 2006/900427, filed Jan. 30, 2006, the disclosures of which are all incorporated by reference in their entirety.

TECHNICAL FIELD

The present invention relates to dosimeters for measuring the dose from radiation fields and a method of manufacturing a dosimeter. In particular, the present invention relates to the field of fibre optic dosimeters.

BACKGROUND

While a range of devices suitable for detecting radiation fields are known, few if any, are suited to use in a dosimeter that satisfies the demands of contemporary radiation therapy techniques. In order to accommodate contemporary therapy techniques, there is a need for a dosimeter that can accurately verify the radiation treatment therapy, accommodate time dependent therapy techniques such as intensity modulated radiation therapy, and also accommodate precision therapy techniques such as stereotactic radiosurgery. The dosimeter should be able to provide high spatial resolution, while retaining the ability to integrate the total dose over the whole treatment period. The dosimeter should also provide a frequently updated reading of the current radiation dose.

A further requirement for brachytherapy applications is that the dosimeter must be of very small size. A still further requirement is for the dosimeter to be relatively robust, an advantage for any application, but again particularly so if the application requires insertion into patient cavities, for example the urethra.

Fibre optic dosimeters have a number of characteristics that provide advantages over the alternatives for use with radiation therapy techniques. The scintillator of a fibre optic dosimeter, consisting of a small water-equivalent plastic material, avoids disadvantages associated with energy dependence or perturbation of the radiation beam, which occurs with conventional alternative dosimeters.

U.S. Pat. No. 5,006,714 describes a scintillator dosimetric probe. A scintillator is positioned in an ionising radiation beam, which creates light output. The light is conducted from the scintillator through a light pipe to a photomultiplier tube, which converts the light into an electric current. The electric current produced by the photomultiplier tube is proportional to the radiation dose-rate incident upon the scintillator. Through a measurement of the electric current, the radiation dose rate may then be displayed or recorded.

An identified problem with fibre optic dosimeters is the generation of Cerenkov (or Cherenkov) radiation in, and transmission of the Cerenkov radiation along, the light pipe. The intensity of the Cerenkov radiation is dependent on factors other than the radiation dose at the scintillator and therefore the Cerenkov radiation represents noise in the measurement signal.

One proposed technique to address the problem of Cerenkov radiation is to use signal processing. United States patent application publication number 2004/0238749 proposes a method for measuring a dose of radiation that involves filtering using two band pass filters.

A problem with the use of signal processing to discriminate between Cerenkov radiation and the signal from a scintillator, is obtaining sufficient discrimination in order to provide the required accuracy of measurement. This problem is particularly apparent when the most effective scintillators emit light at a wavelength that occupies a similar area in the electromagnetic spectrum to Cerenkov radiation.

Another problem with the use of fibre optic dosimeters is to measure radiation intensities that are calibrated, that is the reading is referable to the reading of a standard dosimeter in the same radiation field. The reading is not just dependent on the scintillation signal, but also on the losses between the scintillator and detector. IN practical use there losses can vary, for instance connectors for optical fibres vary in their efficiency. If the dosimeter is disconnected from the detector and reconnected, the reading may change. In addition, the efficiency of common light detectors may change in time as well as vary from one detector to another.

It is therefore an object of the present invention to provide a dosimeter that satisfies one or more of the aforementioned needs and/or overcomes or alleviates at least some of the problems of existing dosimeters, or at least one that provides the public with a useful alternative.

It is a further or alternate object of the present invention to provide a method of manufacture of a fibre optic dosimeter that results in an improved dosimeter or at least one that provides a useful alternative.

In this specification, any reference to the prior art does not constitute an admission that such prior art is widely known or forms part of the common general knowledge in Australia or in any other jurisdiction.

SUMMARY

According to a first aspect of the present invention, there is provided a dosimeter for radiation fields, the dosimeter comprising a scintillator, a light pipe having a first end in optical communication with the scintillator, and a detector to detect light output from a second end of the light pipe and to provide an output indicative of the intensity of the light signal received, wherein the light pipe comprises a hollow core with a light reflective material or structure about the periphery of the hollow core to reflect light within the hollow core and a barrier around the hollow core that reduces or prevents the entry of Cerenkov radiation generated in the light pipe into the hollow core.

The light reflective material or structure may also form at least part of the barrier. For example, the light reflective material or structure may comprise a layer of metal. More particularly, the light reflective material or structure may comprise a layer of silver having a thickness of at least approximately 1 micron.

The light reflective material or structure may comprise a dielectric structure or a microstructure. The dielectric structure or microstructure may also attenuate Cerenkov radiation.

The barrier may comprise layer having a high attenuation of Cerenkov radiation surrounding the light reflective material or structure.

A reflector may be provided about the scintillator so as to cover the surface of the scintillator except for the surface area that is in optical communication with the light pipe.

In use during measurement of a radiation dose applied for radiotherapy or brachytherapy, the light reflective material or structure and the barrier may produce less than 2% Cerenkov radiation in a measurement signal from the scintillator. More particularly, the light reflective material or structure and the barrier may produce less than 1% Cerenkov radiation in a measurement signal from the scintillator.

The scintillator may be located within the hollow core of the light pipe.

The dosimeter may further comprise a light source optically connected to the light pipe, wherein the detector uses light from the light source as a calibration signal. The light source may transmit light along the light pipe towards the scintillator and a reflector may be provided on the opposite side of the scintillator to reflect light received from the light source back along the light pipe so as to be detectable by the photodetector. The light source may be optically connected to the scintillator and generate light that excites the scintillator.

According to a second aspect of the present invention, there is provided a dosimeter for radiation fields, the dosimeter comprising a scintillator, a light pipe having a first end in optical communication with the scintillator, a detector to detect light from a second end of the light pipe and to provide an output indicative of the intensity of the detected light and a light source in optical communication with the light pipe, wherein the detector uses light from the light source as a calibrating signal.

The light source may emit light along the light pipe towards the scintillator and wherein the dosimeter further comprises a reflector at the scintillator to reflect light received from the light source back into the light pipe. In another embodiment, the light source may emits light that excites the scintillator. In this embodiment the dosimeter may be configured so as to reduce or prevent detection of light emitted by the light source by the detector. In one embodiment, this may be achieved at least in part by a reflector provided at an end of the scintillator distal to the light pipe to reflect light received from the scintillator towards the light pipe, the reflector having a higher reflectivity for light generated by the scintillator than for light generated by the light source.

The light source may connected to the light pipe at the second end of the light pipe.

The light source may be in optical communication with the light pipe via a splitter. The splitter may unequally split light received from the light pipe between the detector and the light source, with more light being directed towards the detector than the light source.

The dosimeter may further comprise a second detector in optical communication with the light source and operable to detect the intensity of light emitted from the light source, wherein the dosimeter is configured so that at least a portion of light generated by the light source is directed to the second detector and not the light pipe. The light source may be optically connected to both the second detector and the light pipe by a splitter. Alternatively, the light source may be optically connected to both the second detector and the light pipe by an optical switch. The second detector may be substantially optically isolated from the scintillator.

The light source may be connected to the light pipe at the second end of the light pipe and transmit light along the light pipe towards the detector.

According to a third aspect of the present invention, there is provided a dosimeter for radiation fields, the dosimeter comprising a scintillator, a light pipe having a first end in optical communication with the scintillator, and a detector to detect light output from a second end of the light pipe and to provide an output indicative of the intensity of the light signal received, wherein the light pipe comprises a hollow core with a light reflective material or structure about the periphery of the hollow core to reflect light within the hollow core.

The dosimeter may further comprise a material exhibiting a high attenuation of Cerenkov radiation surrounding the light reflective material or structure. For example, the light reflective material or structure may be a layer of metal. Alternatively, the light reflective material or structure may be a microstructure reflector. In another alternative embodiment, the light reflective material or structure is a multi-layered dielectric structure.

The light reflective material or structure may comprise a layer of metal, a microstructure, or a multi-layered dielectric structure having a thickness and/or design to inhibit Cerenkov radiation passing through it into the hollow core. The layer may be such so that Cerenkov radiation comprises less than 2% of a measurement signal detected by the detector. In some embodiments, the Cerenkov radiation may comprise less than 1% of a measurement signal detected by the detector.

The scintillator may be elongate, having a body extending between first and second ends with a length to width ratio in the range of 1:1 to 5:1, is located with its length aligned with the light pipe and with the first end proximate or inserted into the light pipe and wherein a reflector is provided at the second end of the scintillator so as to reflect light received at the second end towards the first end. In one embodiment, the scintillator may have a length to width ratio in the range 2:1 to 4:1.

In any of the aforementioned aspects of the invention, the light pipe may comprise a large core, high numeric aperture optical fibre.

In any of the aforementioned aspects of the invention, the optical fibre may have a core diameter of approximately 1 mm.

In any of the aforementioned aspects of the invention, the scintillator may have a cross-sectional area substantially the same as, or less than, the cross-sectional area of the light pipe.

In any of the aforementioned aspects of the invention, the scintillator and light pipe may have substantially the same cross-sectional shape.

In any of the aforementioned aspects of the invention, an anti-reflection interface may be provided at the interface between the scintillator and the light pipe. The anti-reflection interface may comprise an adhesive that bonds the scintillator to the light pipe.

In any of the aforementioned aspects of the invention, a refracting element may be located in the light path between the scintillator and the optical fibre to direct light to within a critical angle of the optical fibre.

According to a fourth aspect of the present invention, there is provided a dosimeter for radiation fields, the dosimeter comprising a scintillator, a light pipe having a first end in optical communication with the scintillator, a detector to detect light from a second end of the light pipe and to provide an output indicative of the intensity of the detected light, and a light source in optical communication with the light pipe arranged to transmit light along the light pipe so as to be receivable by the detector, wherein the detector detects light received from the light pipe, including light from the light source and evaluates the detected light for an indicator of the integrity of the optical path between the scintillator and the detector.

According to a fifth aspect of the present invention, there is provided a dosimeter for radiation fields, the dosimeter comprising a scintillator, a light pipe having a first end in optical communication with the scintillator, a detector to detect light output from a second end of the light pipe and to provide an output indicative of the intensity of the light signal received, wherein the light pipe comprises a hollow core with a light reflective material about the periphery of the hollow core and wherein the scintillator is located to be at least substantially contained within the light pipe.

The scintillator may be located so as to be entirely contained within the light pipe.

The dosimeter may further comprise a reflector located to reflect light received at a distant end of the scintillator from the first end of the light pipe back towards the first end of the light pipe.

According to a sixth aspect of the present invention, there is provided a method for obtaining a calibrated measurement from a dosimeter, the method comprising transmitting along at least part of a light pipe connecting a scintillator with a light detector a reference light signal, receiving the reference light signal and using the received reference light signal as a calibrating signal for measurement signals received by the light detector from the scintillator.

The method may further comprise detecting the intensity of the reference light signal without the detected signal having been transmitted along the fibre optic and using the detected intensity as a further calibrating signal.

According to a seventh aspect of the present invention, there is provided a method of obtaining a calibrated measurement from a dosimeter comprising a scintillator in optical communication with a light detector over a light pipe, the method comprising exciting the scintillator with a reference light signal, receiving light generated by the scintillator at the light detector and determining the intensity of the received light, and using the determination of the intensity of the received light as a calibrating signal for measurement signals received by the light detector from the scintillator.

The method may further comprise detecting the intensity of the reference light signal used to excite the scintillator and using the detected intensity as a further calibrating signal. The method may further comprise transmitting the reference light signal from a light source to the scintillator via the light pipe, wherein the process of detecting the intensity of the reference light signal comprises detecting the intensity of the reference light signal generated by the light source without being transmitted via the light pipe.

The method may further comprise using the light received by the detector to evaluate the integrity of the light pipe.

According to an eighth aspect of the present invention, there is provided a method of manufacturing a dosimeter, the method comprising connecting a light detector with a scintillator via a light pipe that comprises a large core, high numerical aperture light pipe with a hollow core that is bounded by a reflector, wherein the scintillator is elongate and has a cross-sectional area approximately equal to or less than the cross-sectional area of the light pipe and the method further comprises providing a reflector for light generated by the scintillator when excited on at least an end of the scintillator distal from the light pipe.

The method may further comprise selecting a scintillator with a width less than 1 mm and a width to length ratio in the range of 1:2 to 1:4.

The method may further comprise inserting the scintillator into the hollow core of the light pipe so as to be at least substantially contained within the hollow core.

The method may further comprise forming the light pipe so as to have a material surrounding the reflector that exhibits a high attenuation of Cerenkov radiation.

The method may further comprise designing the reflector to inhibit Cerenkov radiation from passing through it into the hollow core.

According to a ninth aspect of the present invention, there is provided a method of manufacturing a dosimeter, the method comprising connecting a light detector with a scintillator via a light pipe and connecting a light source operable to generate a reference light signal and transmit the reference light signal along the light pipe so as to be receivable by the light detector, wherein the light detector comprises an electronic processing system and the method comprises adapting the electronic processing system to use the received reference light signal as a calibrating signal for a measurement signal sourced fro the scintillator.

According to a tenth aspect of the present invention, there is provided a method of manufacturing a dosimeter, the method comprising connecting a light detector with a scintillator via a light pipe and connecting a light source operable to generate a reference light signal that excites the scintillator and transmit the reference light signal along the light pipe so as to be receivable by the scintillator, wherein the light detector comprises an electronic processing system and the method comprises adapting the electronic processing system to use light received from the scintillator as a result of being excited by the reference light signal as a calibrating signal for a measurement signal sourced from the scintillator.

Further aspects of the present invention will become apparent from the following description, given by way of example only of currently contemplated preferred embodiments and with reference to the accompanying drawings.

BRIEF DESCRIPTION OF THE DRAWINGS

FIG. 1: shows a schematic representation of a dosimeter in accordance with a first embodiment of the present invention.

FIG. 2: shows a schematic representation of a dosimeter according to a second embodiment of the present invention.

FIG. 3: shows a schematic representation of a third embodiment of a dosimeter according to the present invention.

FIG. 4: shows a schematic representation of a fourth embodiment of a dosimeter according to the present invention.

DESCRIPTION OF THE INVENTION

Figure 5:
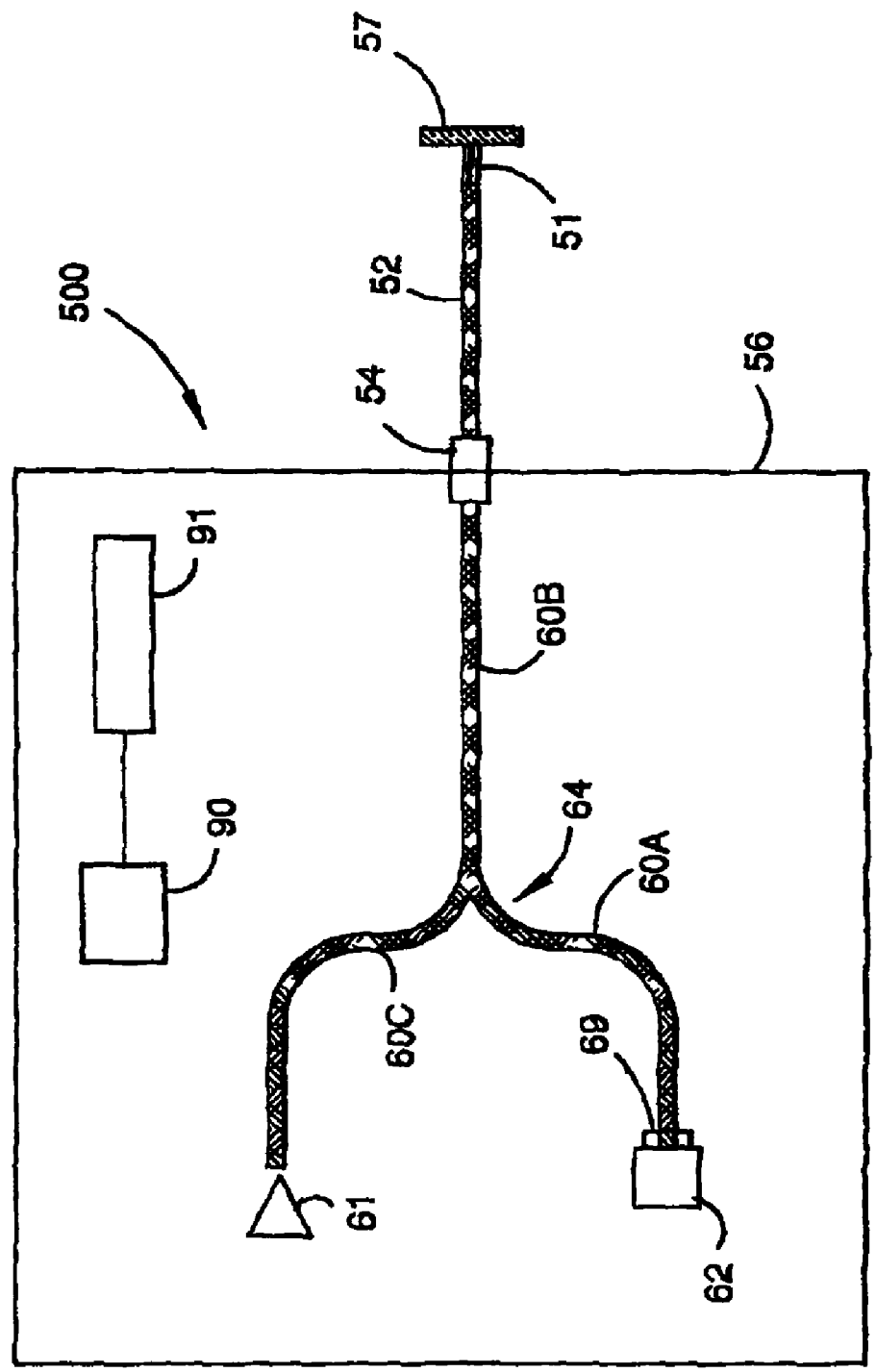
FIGS. 5 to 8: show schematic representations of a further embodiments of a dosimeter according to the present invention, including a calibration function.

The present invention relates to fibre optic dosimeters. The dosimeters may have particular application to radiotherapy and/or brachytherapy, although the present invention is not necessarily limited to these applications.

Referring to FIG. 1 of the accompanying drawings, a schematic view of a first embodiment of a dosimeter is generally referenced by arrow 100.

The dosimeter 100 includes a scintillator 1 in communication with a light pipe, which is suitably an optical fibre 2. Suitable scintillators for use in the present invention include anthracene-doped PolyVinyl Toluene (PVT), Polystyrene (PS) or Poly(methyl)methacrylate (PMMA) based scintillators, or scintillating fibres with a polystyrene-based core and a poly(methyl)methacrylate-based cladding, both available from Saint-Gobain of France and elsewhere.

The fibre 2 has a core 3, a cladding 4 and in the embodiment shown also includes a buffer tubing 5. The buffer tubing 5 may be omitted, both in this embodiment and in the other embodiments of the present invention described herein. The fibre 2 may be a polymer fibre.

The fibre 2 is connected to a photodetector 6. The photodetector 6 may be any suitable detector, including a photomultiplier or photodiode device. Suitable devices and techniques for converting a light signal to an electronic signal and outputting an indication of the intensity of the light signal are well known and will therefore not be described herein.

A reflector 7, for example a metallised film, may be provided over the distal end of the scintillator 1 from the fibre 2. The reflector 7 redirects light that would otherwise escape from the end of the scintillator 1 back towards the fibre 2 and therefore increases the amount of light captured by the fibre 2. In addition, an anti-reflection coating 8 may be provided at the scintillator 1 to fibre 2 junction. The anti-reflection coating 8 is designed for the specific dosimeter 100 and may suitably comprise a material having a thickness T of one quarter wavelength of the light from the scintillator 1 when excited and also have a refractive index approximately equal to the square root of the refractive index of the scintillator 1, which is the higher refractive index material. The anti-reflection coating 8 may be an optically transparent adhesive, for example Saint Gobain BC-600 and therefore perform a dual purpose.

The joint between the scintillator 1 and fibre 2 may be strengthened to add robustness. In particular, a protective plastic tubing 9 may be provided over the scintillator 1 and fibre 2 to hold the scintillator 1 in position. The buffer tubing 5 may be stripped back from the end of the fibre 2 to accommodate the plastic tubing 9. The plastic tubing 9 may be secured to both the scintillator and the fibre 2 by an adhesive (not shown), suitably also Saint Gobain BC-600 or another optically transparent adhesive. The plastic tubing 9 may be any suitable hard plastic, such as PMMA or polycarbonate. The plastic tubing 9 may be opaque to shield out external interfering light. Alternatively, or in embodiments where the plastic tubing 9 is not provided an additional light shield (not shown) may be provided. Also, the shape of the scintillator may be varied, for example to taper inwards at the connection point to provide a stronger connection with the fibre.

The dimensions of the scintillator 1 are important in many applications of dosimeters as a trade-off between spatial resolution and signal strength. A smaller scintillator 1 allows increased spatial resolution, but results in a corresponding reduction in the detectible signal collected by the fibre 2. Consequently, the signal to noise ratio of the signal received by the photodetector 6 is decreased.

In addition, the signal received from the scintillator 1 by the fibre 2 may be increased if a large core optical fibre (>0.4 mm) is used. Preferably, the large core optical fibre also has a high numerical aperture (>0.4). Two examples of currently available large core, high numerical aperture fibres are Mitsubishi Rayon Super Eska SHV4001 (0.98 mm core, numerical aperture=0.5) and Saint Gobain BCF-98 (0.98 mm core, numerical aperture=0.58).

The combination of having a reflector 7, a large core optical fibre 2 and a small scintillator 1, having a diameter of equal to or less than approximately 1 millimetre may be particularly advantageous. Further advantage may be obtained if a high numerical aperture fibre is used with this combination. Still further advantage may be obtained if the shape of the scintillator 1 matches the shape of the fibre 2, for example if both have a circular cross-section. Throughout this description it is assumed that the fibre and scintillator both have circular cross-sections, which represents the most preferred embodiment, but is not essential. Also, preferably the scintillator occupies a cross-sectional area substantially equal to or less than the cross-sectional area of the optical fibre.

The combination may be used to provide a high spatial resolution, while still providing a sufficient signal to noise ratio at the input of the photodetector 6 to enable accurate measurements to be obtained. The dosimeter 100 of the present invention made in these dimensions may be suitable for, for example, insertion into a catheter, making it suitable for brachytherapy applications.

In an alternative embodiment, instead of using an adhesive at the scintillator to fibre interface, the scintillator 1 and fibre 2 may be welded together using radio frequency (RF) radiation. The welding process may involve pressing the scintillator and fibre ends together between two halves of a cylindrical die through which the RF radiation is applied, whilst preferably also applying axial force to compress the joint. The fibre and scintillator may be cut at right-angles to the longitudinal axis of the fibre or at some other angle.

FIG. 2 shows a second embodiment of a dosimeter, which is generally referenced by arrow 200, which may also have particular application to brachytherapy, and may share the same combination of features described herein above as advantageous in relation to the dosimeter 100 shown in FIG. 1. The dosimeter 200 shown in FIG. 2 has a scintillator 21, which will typically have a diameter of less than 1 millimetre for brachytherapy applications. The scintillator 21 may have a length to diameter ratio in the range of 1:1 to 5:1 in order to provide an appropriate balance between signal strength and spatial resolution for some applications. In FIG. 2, the ratio is approximately 3.5:1 and in FIG. 1 the ratio was approximately 2.6:1. The examples provided in FIGS. 1 and 2 show scintillators in the most preferred range of dimensions as presently contemplated, namely having a length to diameter (or width) ratio in the range of 2:1 to 4:1. Using a scintillator within this range may provide an optimal balance between the two requirements of obtaining high spatial resolution and maintaining sufficient signal strength to obtain an accurate reading.

In the embodiment in FIG. 2, the scintillator 21 is inserted into a fibre 22. The fibre 22 includes a core 23, a cladding 24 and a buffer tubing 25. Again, the fibre 22 may be a large core polymer fibre connected to a photodetector 26. Like the dosimeter 100, the dosimeter 200 may include an anti-reflective coating 28 to match the impedance of the scintillator 21 with the fibre 22, and may also include a reflector 27 at the distal end of the scintillator 21.

To construct the dosimeter 200, a cylindrical hole is formed in the end of the fibre 2 in the region of the core 23. The hole preferably removes substantially the entirety of the core 23, while leaving the cladding 24 intact. The scintillator 21, with the optional impedance matching anti-reflective coating 28 is then inserted into the hole and adhered into place. The reflector 27 is then applied to the end of the fibre 22, suitably also with an adhesive. Again, Saint Gobain BC-600 may be used as the adhesive. If the optical fibre is a hollow core optical fibre (see herein below), then the step of forming the cylindrical hole in the end of the fibre may be omitted.

An advantage of the dosimeter 200 is that there is no join between the scintillator 21 and the fibre 22. This may increase the robustness of the dosimeter 200, which may be particularly advantageous in applications such as brachytherapy where the fibre 22 has to travel around bends in order to reach a measurement location.

FIG. 3 shows a schematic representation of a third embodiment of a dosimeter in accordance with the present invention, which is generally referenced by arrow 300. The dosimeter 300 includes a scintillator 31 and an optical fibre 32 having a core 33, cladding 34 and optional buffer tubing 35. The cladding 34 may be a sheath. A reflector 37 is provided at the end of the scintillator 31 and about the sides of the scintillator 31. Extending the reflector 37 to around the sides of the scintillator 31 will provide advantage when the numerical aperture of the fibre 32 is larger than the numerical aperture of the scintillator 31, due to increasing the numerical aperture of the scintillator 31. An anti-reflection coating 38 is provided at the interface of the scintillator 31 with the fibre 32. The combination of using a small scintillator and a fibre with a large core and high numerical aperture may also be used for the dosimeter 300.

The fibre 32, which is connected to a photo detector 36 has a hollow core 33. The hollow core fibre 32 has a metallised coating 39 defining the boundary of the core 33. The metallised coating 39 may be formed by passing a silver nitrate solution through the pipe so that the silver precipitates out onto the inner surface of the pipe. In an alternative embodiment, the metallised layer 39 may be replaced by another reflective material or structure, for example a coating of dielectric layers or a microstructure array to create internal reflections.

In one embodiment, the fibre 32 may be a Bragg tube. Various other types of hollow fibre may be suitable for use in the present invention have also been designed.

One example of a fibre that may be used as the hollow light pipe is a silver lined air-core silica waveguide designed for the 2.9-10.6 µm wavelength range. A fibre of this type is available from Polymicro Technologies, LLC, which currently has its corporate headquarters in Phoenix, Ariz., United States of America. The silver lining may perform a dual function of providing an internal reflector for light, allowing light to travel along the fibre, and forming at least a partial barrier to the entry of Cerenkov radiation generated in the cladding 34 into the core 33. Other materials may be used to form the internal reflector, for example aluminium. The barrier may also prevent external environmental light entering the light pipe.

A layer of silver having a thickness of approximately 1 micron or more may be suitable for most applications to obtain measurements for which any error introduced by the detection of Cerenkov radiation is sufficiently small. Thicknesses as low as approximately 0.5 microns may still provide useful blocking of Cerenkov radiation, whereas forming layers at thicknesses above approximately 2 microns may create difficulties in maintaining a smooth surface, resulting in excessive losses. The actual thickness required will depend on the manufacture technique used and the requirements specification for the dosimeter.

By adapting the properties of the fibre in accordance with the embodiments described herein, it is anticipated that relatively stringent requirements specifications will be able to be met, which may not have been previously possible using standard fibres. For example, a requirement for less than 95% propagation loss over a length of 1 metre of the light pipe and less than 2% or less than 1% noise in the signal attributable to Cerenkov radiation and/or environmental light passing into and propagating along the light pipe. The requirements may be met by selecting the properties of the reflector and the surrounding material and performing routine testing to verify compliance of the particular light pipe with the requirements.

The containment of any Cerenkov radiation that passes the reflective material or structure provided on the inside of the hollow light pipe may be due to imperfections in the surface of the reflective material. Accordingly, by reducing these imperfections, the transmission of Cerenkov radiation along the light pipe may be reduced. For example, the imperfections may be reduced for a silver lined hollow fibre by iodising the surface of the fibre. An appropriate depth of iodisation may have the additional advantage of decreasing the losses of the fibre.

If the reflector provides an insufficient barrier to Cerenkov or environmental radiation, an additional barrier, for example a material that has a property of a high attenuation of Cerenkov radiation, may be located close to the outer surface of the reflector.

In one embodiment the cladding 34, or a layer of material between the cladding 34 and the reflective material or structure, may be selected to attenuate Cerenkov radiation, thereby further reducing the occurrence of Cerenkov radiation in the measured signal. This embodiment may have particular application where the material forming the internal reflector of the fibre, for example a silver or aluminium lining, is not sufficiently opaque to Cerenkov radiation. It may also have particular application to light pipes that have a microstructure or multi-layered dielectric reflector, with the attenuating material placed about the reflective structure.

Another example of a fibre that may be used as the hollow light pipe is a hollow-core, photonic band-gap fibre manufactured from a partially coated polymer, which is rolled into a tube then drawn. Details of a fibre of this type can be found in:
a) "Analysis of mode structure in hollow dielectric waveguide fibers", Mihai Ibanescu, Steven G. Johnson, Marin Soljacic, J. D. Joannopoulos, Yoel Fink, On Weisberg, Torkel D. Engeness, Steven A. Jacobs, and M. Skorobogatiy, Physical Review E, Vol. 67(4), article number 046608, (2003).
b) "Wavelength-scalable hollow optical fibres with large photonic bandgaps for CO2 laser transmission", Burak Temelkuran, Shandon D. Hart, Gilles Benoit, John D. Joannopoulos & Yoel Fink, Nature, Vol. 420, pp. 650-653, Dec. 12, 2002.
c) "Analysis of general geometric scaling perturbations in a transmitting waveguide. The fundamental connection between polarization mode dispersion and group-velocity dispersion", M. Skorobogatiy, M. Ibanescu, S. G. Johnson, O. Weiseberg, T. D. Engeness, M. Soljacic, S. A. Jacobs, and Y. Fink, Journal of Optical Society of America B, vol. 19, pp. 2867-2875, (2002).
d) "Geometric variations in high index-contrast waveguides, coupled mode theory in curvilinear coordinates", M. Skorobogatiy, S. A. Jacobs, S. G. Johnson, and Y. Fink, Optics Express, vol. 10, pp. 1227-1243, (2002).
e) "The Gold Standard" or "External Reflection from Omnidirectional Dielectric Mirror Fibers", Science, Vol. 296, pp 510-513, Apr. 19, 2002.

A third example of a suitable fibre is a hollow-core photonic bandgap, microstructured polymer optical fibre as described in "Hollow core microstructured polymer optical fibre", A. Argyros, M. A. van Eijkelenborg, M. C. J. Large, I. M. Basset, Optics Letters, 15 Jan. 2006.

These types of fibre may again be modified as described herein to reduce Cerenkov radiation in the measurement signal.

The dielectric layers or microstructure may be designed to specifically provide a block to Cerenkov radiation. For example, a microstructure or dielectric layer arrangement could provide a reflector for scintillator light at its inner surface and a reflector for Cerenkov radiation on its external surface. When a blue scintillator is used, then the microstructure or dielectric layer may have substantially the same reflection properties from both sides and may be designed with sufficient thickness, for example to result in less than 2%, more preferably less than 1% of Cerenkov radiation in the measurement signal. When a different colour scintillator is used, the microstructure or dielectric layer arrangement may provide different reflection or light absorption characteristics for light contacting its inner surface than for light contacting its outer surface. This may in one embodiment be achieved by in effect stacking two reflectors on top of each other.

To create the block to Cerenkov radiation, the dielectric layers or microstructure may be made relatively thick, for example approximately 10 microns thick or more.

In addition, thin film, air-core polymer fibres may be suitable for use with embodiments described herein. The Applicant understands that fibres of this type are due to become commercially available in the near future.

The use of an air core fibre significantly reduces and may even eliminate the need to account for Cerenkov radiation in the signal received at the photodetector. Accordingly, more accurate measurements may be obtained, a scintillator that emits light having a blue wavelength may be used more effectively and the size of the scintillator 31 may be reduced.

In particular, the use of an air core light pipe that has its core coated with a metal layer, such as a layer of silver may transmit a very small amount or substantially zero Cerenkov radiation to the photodetector. In one embodiment, the layer may result in less than 2% or even less than 1% Cerenkov radiation in the measurement signal. The metal layer inhibits or prevents Cerenkov radiation penetrating into the core of the optical fibre and propagating to the detector. Accordingly, optical fibre constructions that utilise a hollow core and include a barrier to Cerenkov radiation very near the periphery of the core and a reflective surface of the core to allow light propagation may be particularly useful for dosimeters for measuring radiation doses. In the case of metal lined cores, the barrier and reflector are provided in a single layer of material.

FIG. 4 shows a schematic representation of a fourth embodiment of a dosimeter, which is generally referenced by arrow 400. The dosimeter 400 has a structure similar to the dosimeter 100, including a scintillator 41, which preferably has a length to width ratio in the range of 1:1 to 5:1, more preferably between 2:1 and 4:1, an optical fibre 42 having a core 43, which may be air, a cladding 44 and a buffer tubing 45. A protective plastic tubing 49 extends across the scintillator 41 to fibre 42 junction. A photodetector 46 receives light from the fibre 42 and provides an output indicative of the intensity of light received from the fibre 42. A reflector 47 is provided at an end of the scintillator 41 to reflect light back towards the fibre 42.

The dosimeter 400 further includes a GRIN lens 48 or other suitable refracting element along the light path between the scintillator 41 and fibre 42. The GRIN lens redirects light from the scintillator 41 that is outside of the critical angle of the fibre 42 to an angle within the critical angle of the fibre 42. Therefore, in effect the GRIN lens 48 increases the numerical aperture of the fibre 42, allowing an increased amount of light to be captured. This may enable a still smaller scintillator 41 to be used and/or provide an increase in the signal to noise ratio at the photodetector 46.

Those skilled in the relevant arts will appreciate that aspects of all four embodiments may be interchanged to provide further embodiments of dosimeter. For example, the scintillator 31 in the dosimeter 300 may be inserted fully into the optical fibre 32 (the hole having already been formed as an inherent part of the air core 33) and the scintillator 41 and GRIN lens 48 may be inserted into the optical fibre 42. A reflector may also be provided about the sides of the scintillator 1, scintillator 21 and/or scintillator 41 in the dosimeters 100, 200 and 400 respectively. A hollow core fibre may be used for the dosimeters 100, 200 where the application allows the use of a hollow core fibre, which may be less tolerant to bends than polymer fibres. Also, a GRIN lens may be used at the scintillator to fibre interface in the dosimeters 100, 200 and 300.

Where light pipe having a core coated with a reflective layer is used, then in one embodiment the scintillator may be inserted fully or substantially into the core of the light pipe. This may provide a combination of a robust scintillator to light pipe connection, provide the advantages associated with having a reflector about the sides of the scintillator (the reflector being the reflective metal layer of the light pipe), and occupying a small cross-sectional area.

Any Cerenkov radiation that is generated by a dosimeter in accordance with the present invention may be reduced by orienting the fibre, as much as possible so as to be perpendicular to the radiation field. The applicant has determined that orientation at this angle may minimise the generation of Cerenkov radiation.

In addition, the photodetector 6, 26, 36, 46 may employ signal processing to further reduce the effects of any Cerenkov radiation and/or to filter out any further interfering signals.

In embodiments utilising a hollow core optical fibre, then this fibre may be joined with a solid core fibre that connects to the photodetector. This may be required, for example, where the scintillator is distant from the detector to decrease the losses (account should be had to the additional reflective losses at the interface between the hollow core fibre and the polymer fibre) and/or to reduce the cost of manufacture. The hollow core fibre may be used in as much of the radiation field as possible, preferably the entirety of the radiation field, so as to minimise the propagation of Cerenkov radiation to the photodetector.

Figure 6:
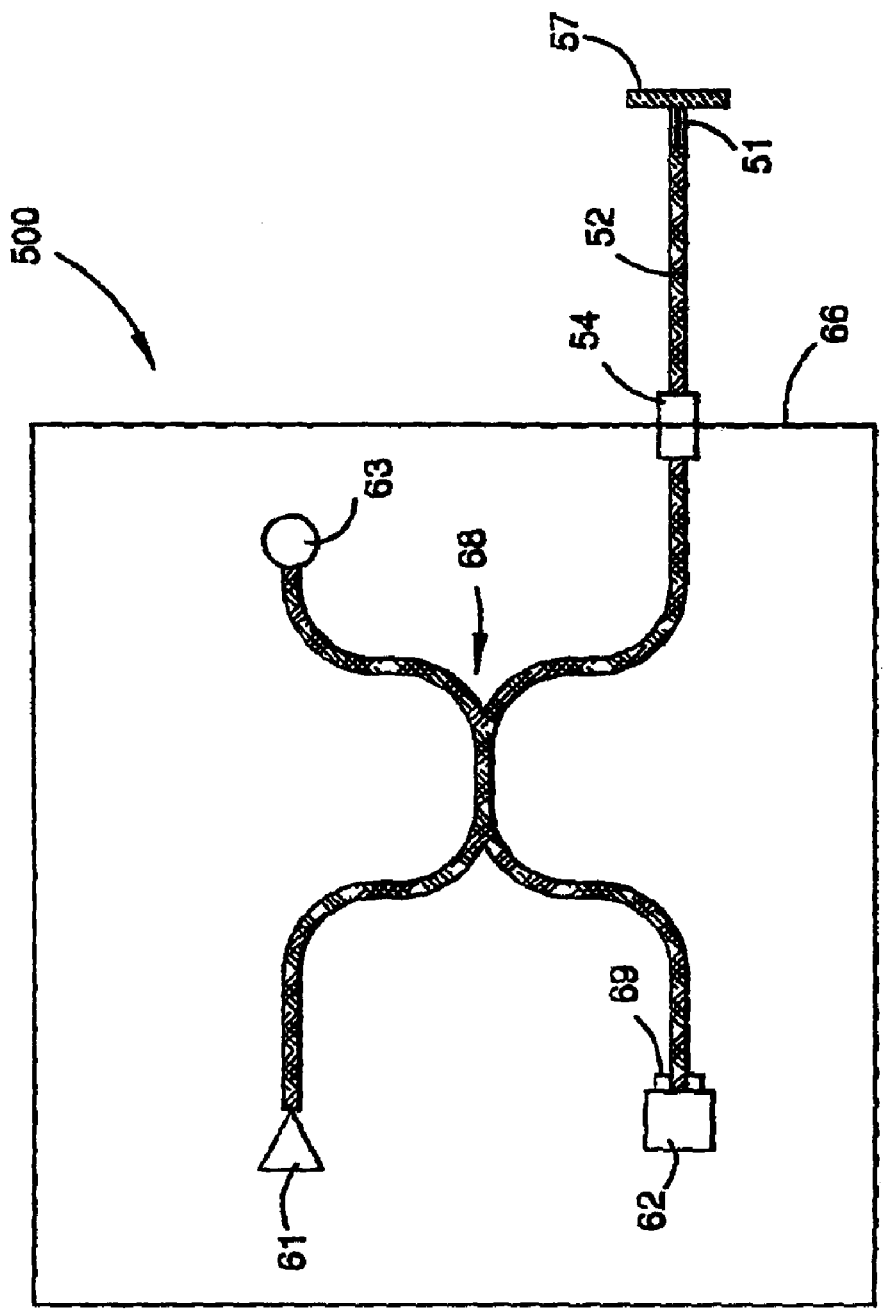
Figure 7:
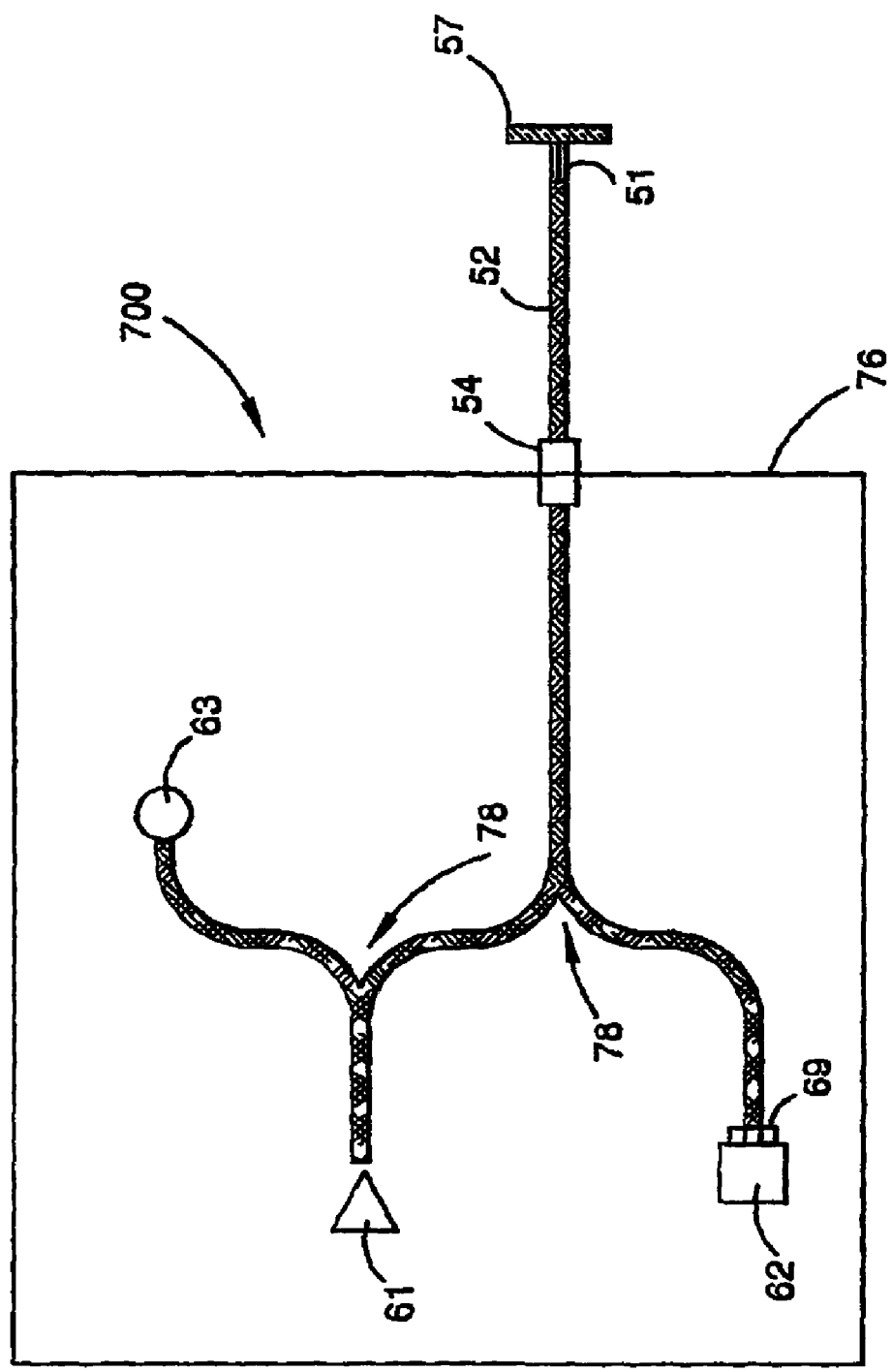

FIGS. 5, 6, and 7 show dosimeters of the present invention including a calibration function. In FIGS. 5, 6 and 7, like reference numerals refer to like components.

Referring now to FIG. 5, a dosimeter 500 in accordance with another aspect of the present invention is shown. The dosimeter 500 includes a photodetector 56 and an optical fibre 52 connected to the photodetector 56 through a connector 54. A scintillator 51 connected to the optical fibre 52 at one end and having a reflector 57 at the other end provides the measurement signal for the dosimeter 500. The dosimeter 500 may be similar to the dosimeter 100 shown in FIG. 1, except for the photodetector 56. The photodetector 56 may also be used with dosimeters of the type shown in FIGS. 2 to 4 and with further alternative fibre optic dosimeters.

The photodetector 56 includes a "Y" coupling or splitter 64, which connects both a light emitting diode (LED) 61 and a photodetector circuit 62 to the optical fibre 52. The LED 61 may be replaced by an alternative suitable light source.

The LED 61 admits a controlled amount of light into the optical fibre 52, which is reflected by the reflector 57 back to the photodetector 56 and photodetector circuit 62. In FIGS. 5 to 7 the reflector 57 is shown larger than the scintillator 51, but in most practical dosimeters the reflector 57 will be approximately the same size as the scintillator 51. The photodetector 56 is then operated so that the photodetector circuit 62 obtains a measurement of the light received from the optical FIG. 52 with the LED 61 on, but without radiation being applied to the scintillator. This provides a calibration signal for the dosimeter 500.

In one embodiment, the light from the LED 61 does not excite the scintillator 51. In this embodiment the LED 61 may be used to check the security of the optical paths against the ingress of contaminating light from the environment, for example due to a breakage during insertion of the scintillator to the measurement location.

In another embodiment, the light from the LED 61 excites the scintillator 51 and the LED 61 may be used to calibrate for variation over time in the light produced, propagated and/or detected for the same radiation field. In this embodiment, the reflector 57 may be omitted, or alternatively a reflector 57 in the form of a selective reflector may be provided, which has a higher reflectivity for light produced by the scintillator 51 than for light, produced by the LED 61. A reflector of this type may be formed by using a wet deposition technique to deposit a thin layer of silver. Sputtered aluminium may also be able to be used, but the reflectivity profile may be flatter in the blue/UV region.

When the scintillator 51 has radiation applied to it and is generating light, the photodetector 56 can then provide an output of the light signal received relative to the a signal that is sourced from the LED 61. Those skilled in the relevant arts will appreciate that this allows any variations in the connection efficiency, losses in the fibre and variations in the detector efficiency, as well as other variations that may occur, to be automatically corrected. The LED 61 may also allow a quantitative radiation measurement to be obtained instead of just a relative dose measurement.

The detector 56 and the other embodiments of detector described herein includes an electronic processing system, such as a microprocessor 90 and associated memory 91 to control the detector. Those skilled in the relevant arts will appreciate that the electronic processing system may comprise a microcontroller, digital signal processor, programmable logic device depending on the required functionality and particular implementation.

The microprocessor 90 may record the intensity of the calibration light signal (either the light received from the LED 61 after being transmitted along the optical fibre 52 or the light received from the scintillator 51 after being excited by the LED 61) in a component of the memory 91 for use in computing a calibrated measurement. Alternatively, the electronic processing system may simply cause information indicative of the intensity of the received light to be displayed, printed or otherwise communicated to an operator of the dosimeter 500, who could then calculate a calibrated measurement manually.

If the losses of the return signal (3 dB) that result from the use of the splitter 64 proved to be too high, the splitter 64 could be replaced by a coupler having a fibre optic switch.

Alternatively, to reduce losses, the Y junction of the splitter 64 could be skewed to strongly favour the return signal to the photodetector circuit 62, which requires the most sensitivity in practice. For example, the arm 60A of the Y junction 60 may be provided in line with the arm 60B. The arm 60C can be at any angle relative to the arm 60B, provided it does not exceed the critical angle of the fibre forming the splitter 64.

In possible alternative embodiments, the LED 61 may be provided outside of the photodetector 56.

FIG. 6 shows a further alternative dosimeter 600, which is similar to the dosimeter 500, except that instead of the 1×2 splitter 64, a 2×2 coupler 68 is used in a photodetector 66. The photodetector circuit 62 may be a photomultiplier tube while a second photodetector circuit 63 may be a less sensitive device. The LED 61 in this embodiment emits light at a wavelength that excites the scintillator 51. Therefore, the LED 61 may emit UV light at 365 nm to excite fluorescence in an anthrascene scintillator. A suitable LED 61 may be the 365 nm UV-LED available from Nichia of Japan.

The photodetector circuit 63 provides a measure of the power emitted by the LED 61 and can normalise any calibration measurements to account for any deterioration of the LED output power. The photodetector 600 can provide the benefits of the photodetector 500, but can also calibrate the sensitivity of the dosimeter with respect to it's scintillation sensitivity. The integrity of the dosimeter can also be tested in-situ to check for breakages during insertion. Again, the reflector 57 may selectively reflect light generated by the scintillator 51 and absorb light fro the LED 61.

FIG. 7 shows a dosimeter 700 similar to the dosimeter 600, having a photodetector 76 similar to the photodetector 66 except that the 2×2 coupler 68 has been replaced by a pair of 1×2 couplers 78 selected with splitting ratios to reduce the 3 dB loss that occurs with the dosimeter 600.

For the dosimeters shown in FIGS. 5, 6 and 7 that have an LED or other light source that excites the scintillator 51, it may be advantageous to include an optical filter in front of the Photodetector/Photodetector A to prevent light from the LED directly falling on that detector.

There are two methods of calibrating the dosimeters 500, 600, 700 shown in FIGS. 5, 6 and 7 respectively. The first method includes providing an LED which emits a UV wavelength to excite the scintillator.

The LED 61 emits UV light, which in FIGS. 6 and 7 is measured with the photodetector B 63 inside the instrument to determine the magnitude of light emitted. If the light from the LED is stable over time or decays at a known rate then the photodetector B 63 may not be needed. This simplified version is shown in FIG. 5.

The UV light excites the scintillator 51. The light generated in the scintillator is then measured by the photodetector A 62. It is desirable to measure in photodetector 62 only the light generated by the scintillator 51 and there are two measures to ensure this. First, the mirror 57 is chosen to have a minimum reflectance for the UV light. Second a filter 69 is placed in front of photodetector 62.

A reference magnitude is established by exciting the scintillator 51 at the time of calibration with a radiation source (not shown). The magnitude of the signal measured from the scintillator in any situation can then be compared to the reference magnitude to account for changes in the loss in the path between the scintillator 51 and the photodetector 62. The dosimeter is calibrated for dose by using a radiation source with a known dose rate to the scintillator 51.

The second method uses a LED 61 that emits a wavelength of light similar in wavelength to the scintillator light. The LED light is reflected back to the photodetector 62 at the interfaces between the instrument fibre 60 and the detector fibre 52 and between the fibre 52 and the scintillator 51. The LED light is also strongly reflected at the mirror 57.

Changes in the loss between the scintillator 51 and the photodetector 62 can be accounted for by the changes in the magnitude of light detected from the LED 61 by the photodetector 62. This can be used in the same way as the first method previously described to determine the absolute dose or dose rate measurement.

Figure 8:
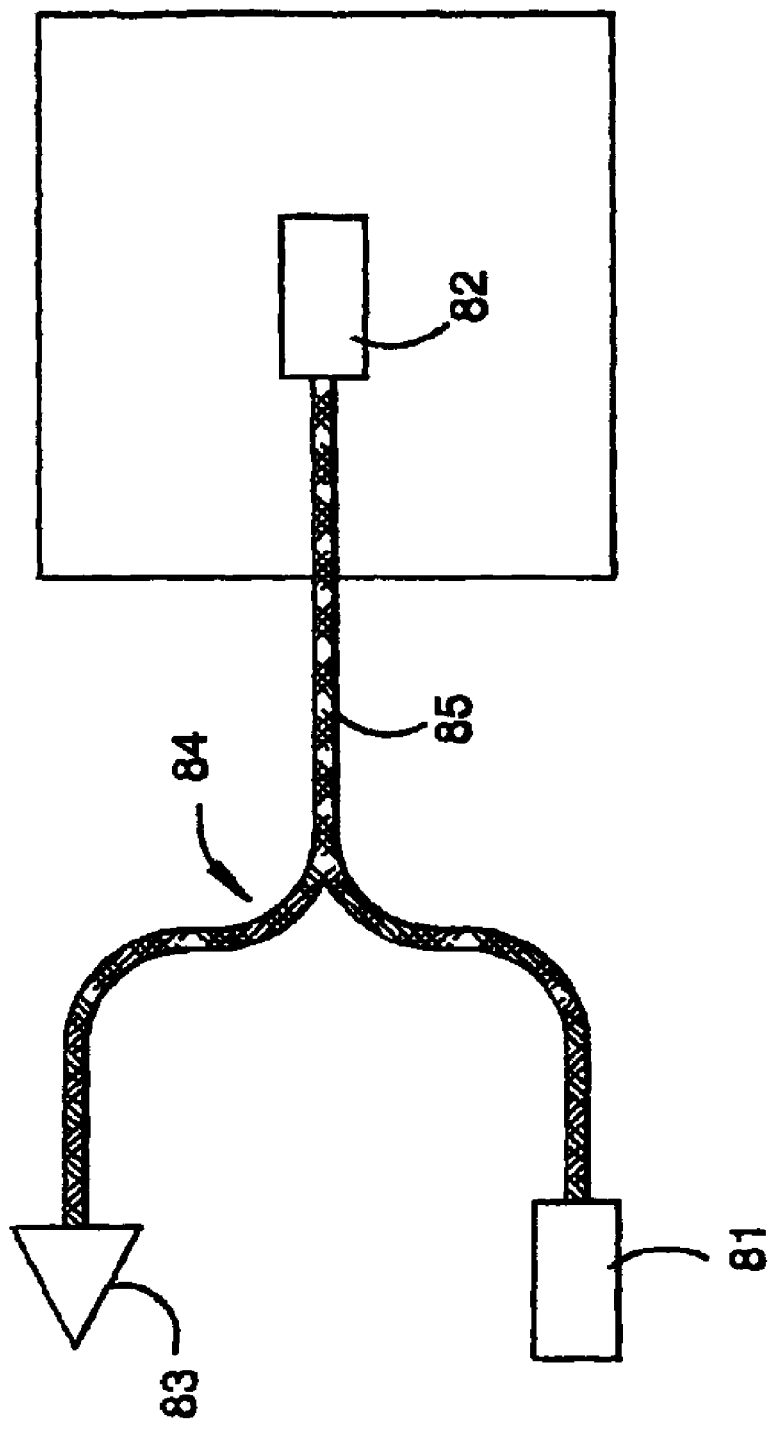

In a further alternative embodiment of a dosimeter with a calibration function, the LED may be located away from the photodetector. This embodiment is shown in FIG. 8, which shows a scintillator 81, a photodector 82 and an LED 83 connected by a 1×2 splitter 84 and an optical fibre 85. The scintillator 81 may be of the type described herein above in relation to FIGS. 1 to 7.

The LED 83 can be used to determine and correct for any change in sensitivity of the photodetector 82. The LED 83 is used as a constant reference light source.

An exemplary embodiment of a dosimeter, in accordance with a currently contemplated preferred embodiment for brachytherapy applications, has the following characteristics:

1) A silver lined cylindrical hollow core optical fibre with a polymer cladding. The hollow core has a diameter of approximately 1 mm and a length of approximately 0.6 m, connecting directly to a photomultiplier detector. The thickness of the silver lining is approximately 1 micron.

2) A cylindrical PVT scintillator of slightly less diameter than the core and a length to width ratio of approximately 3:1, inserted into the hollow core so as to have a close fit with the silver lining of the optical fibre.

3) A selective reflector for light at 365 nm is adhered to the outer end of the scintillator using Saint Gobain BC-600.

4) A photomultiplier detector including a 365 nm LED as described in relation to FIG. 7, with the 1×2 coupler 78 connecting the optical fibre 52 to the photodetector 62 and biased towards the optical fibre 52.

Where in the foregoing description reference has been made to specific integers having known equivalents, then those equivalents are hereby incorporated herein as if individually set forth.

Those skilled in the relevant arts will appreciate that modifications and additions may be made to the present invention without departing from the scope of the invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A dosimeter for radiation fields, the dosimeter comprising:
   a scintillator;
   a hollow core light pipe in optical communication with the scintillator;
   a detector in optical communication with the hollow core light pipe to receive, via the light pipe, light generated by the scintillator and to generate an output indicative of the light detected; wherein the hollow core light pipe comprises:
   a metalized layer that is substantially opaque to Cerenkov radiation, the metalized layer having an inner surface defining the hollow core of the hollow core light pipe and an outer surface; and
   cladding surrounding the outer surface of the metalized layer.

2. The dosimeter of claim 1, wherein the metalized layer has a thickness of between above 1 micron and below 2 microns.

3. The dosimeter of claim 1, wherein the metalized layer comprises silver.

4. The dosimeter of claim 1, wherein the inner surface of the metalized layer has been iodized.

5. The dosimeter of claim 1, wherein the scintillator generates blue light when excited by a radiation field.

6. The dosimeter of claim 1, further comprising a solid core light pipe interposed between the detector and the hollow core light pipe.

7. The dosimeter of claim 1, wherein the scintillator is located substantially within the light pipe.

8. The dosimeter of claim 1, wherein the light pipe has a first end in optical communication with the scintillator and the dosimeter, further comprises a reflector located to reflect light received at a distant end of the scintillator from the first end of the light pipe back towards the first end of the light pipe.

9. The dosimeter of claim 7, wherein the scintillator is located so as to be entirely contained within the light pipe.

* * * * *